United States Patent
Okamoto

(10) Patent No.: US 7,927,699 B2
(45) Date of Patent: Apr. 19, 2011

(54) POROUS ZIRCONIA POWDER AND PRODUCTION METHOD OF SAME

(75) Inventor: Hiroshi Okamoto, Osaka (JP)

(73) Assignee: Daiichi Kigenso Kagaku Kogyo Co., Ltd., Osaka (JP)

(*) Notice: Subject to any disclaimer, the term of this patent is extended or adjusted under 35 U.S.C. 154(b) by 506 days.

(21) Appl. No.: 11/843,217

(22) Filed: Aug. 22, 2007

(65) Prior Publication Data

US 2008/0050593 A1 Feb. 28, 2008

(30) Foreign Application Priority Data

Aug. 22, 2006 (JP) .................. 2006-253460
Aug. 29, 2006 (JP) .................. 2006-263536

(51) Int. Cl.
*B32B 5/16* (2006.01)
*C01G 25/02* (2006.01)

(52) U.S. Cl. ........................ 428/402; 423/608
(58) Field of Classification Search .................. 428/402; 423/608

See application file for complete search history.

(56) References Cited

U.S. PATENT DOCUMENTS

| | | | |
|---|---|---|---|
| 5,908,800 A | 6/1999 | Bonneau et al. | |
| 6,162,757 A | 12/2000 | Change et al. | |
| 6,228,799 B1 | 5/2001 | Aubert et al. | |
| 6,685,898 B2 * | 2/2004 | Allen et al. | 423/213.2 |
| 6,846,410 B2 * | 1/2005 | McNeff et al. | 210/198.2 |
| 7,632,769 B2 * | 12/2009 | Okamoto | 501/103 |
| 7,642,210 B2 * | 1/2010 | Okamoto | 501/103 |
| 2006/0018822 A1 | 1/2006 | Okamoto | |
| 2007/0264486 A1 | 11/2007 | Verdier | |

FOREIGN PATENT DOCUMENTS

| | | |
|---|---|---|
| EP | 1 006 081 A1 | 6/2000 |
| FR | 2 875 149 A1 | 3/2006 |
| GB | 627493 A | 8/1949 |
| JP | 3016865 B2 | 12/1999 |
| JP | 2000-176282 A | 6/2000 |
| JP | 2001-524918 A | 12/2001 |
| JP | 2003-277059 A | 10/2003 |
| JP | 2006-036576 A | 2/2006 |
| WO | WO 98/45212 A1 | 10/1998 |

OTHER PUBLICATIONS

European Search Report dated Dec. 19, 2007 issued in corresponding European Application No. 07114715.1.

* cited by examiner

*Primary Examiner* — H. (Holly) T Le
(74) *Attorney, Agent, or Firm* — Westerman, Hattori, Daniels & Adrian, LLP

(57) ABSTRACT

The present invention provides a porous zirconium powder having improved heat resistance of total pore volume, and a simple production method thereof. More specifically, the present invention provides:

(1) a porous zirconium powder in which total pore volume following heat treatment for three hours at 1000° C. is at least 0.75 ml/g, and total volume of pores having a diameter of 10 to 100 nm following heat treatment for three hours at 1000° C. is at least 30% of the total pore volume, and (2) a production method of a porous zirconia powder comprising: forming a basic zirconium sulfate by adding a sulfating agent to a zirconium salt solution; forming zirconium hydroxide by neutralizing the basic zirconium sulfate; and heat-treating the zirconium hydroxide, wherein, when adding the sulfating agent to the zirconium salt solution, the sulfating agent is added to the zirconium salt solution having a temperature of 100° C. or higher in an autoclave.

5 Claims, 2 Drawing Sheets

POROUS ZIRCONIA POWDER AND PRODUCTION METHOD OF SAME

TECHNICAL FIELD

The present invention relates to a porous zirconia powder and a production method of the same.

BACKGROUND ART

In the past, the specific surface area at 400° C. of zirconia used as catalyst supports was about 100 m$^2$/g. In addition, zirconia having a larger specific surface area was typically amorphous without having a constant structure. Consequently, in the case of using zirconia as a catalyst support, stable performance at high temperatures is unable to be obtained as a result of the specific surface area thereof decreasing at temperatures equal to or higher than 400° C. Thus, it is necessary to improve the heat resistance (thermal stability) at high temperatures in order to use zirconia as a catalyst support.

In contrast, zirconia-ceria compositions composed of zirconium oxide and cerium oxide have higher heat resistance than zirconia in that they are able to ensure a comparatively large specific surface area even at a high temperature of 1000° C.

Recently, heat resistance of pore volume has also come to be required in addition to heat resistance of specific surface area of catalyst supports. In the case of loading an active species in the form of a precious metal (active previous metal) onto a catalyst support, the precious metal is loaded with good dispersibility into pores have a diameter of 10 to 100 nm. Thus, a catalyst support having a large pore volume consisting of pores having a diameter of 10 to 100 nm even at high temperatures is desirable. Namely, heat resistance is required such that pores have a diameter of 10 to 100 nm even at high temperatures.

Published Japanese Translation No. 2001-524918 of a PCT International Publication describes a cerium oxide, zirconium oxide, (Ce,Zr)O$_2$ mixed oxide and (Ce,Zr)O$_2$ solid solution having a total pore volume in excess of about 0.8 ml/g following calcining in air for 2 hours at about 500° C.

Japanese Patent No. 3016865 describes a mixed cerium or zirconium oxide having a total pore volume of at least 0.6 cm$^3$/g and composed of pores in which at least 50% of the total pore volume has a diameter of 10 to 100 nm. In addition, a mixed oxide having a pore volume of about 0.8 cm$^3$/g following calcining for 6 hours at 800° C. is described in the examples thereof.

However, when considering that the temperature at which automotive catalysts are actually used is 1000° C. or higher, the mixed oxides described in the two publications mentioned above are unlikely to have adequate heat resistance at high temperatures.

On the other hand, Japanese Patent Application Laid-open No. 2006-36576 describes a zirconia porous body and a production method thereof. More specifically, a zirconia porous body is described having a peak pore diameter of 20 to 110 nm for a pore size distribution as determined by the BJH method, and a total pore volume of not less than 0.4 cc/g in which the total volume of pores having a diameter of 10 to 100 nm accounts for 50% or more of total pore volume.

In addition, the production method consists of a method for producing a zirconia porous body comprising the steps of: (1) a first step of mixing a basic zirconium sulfate-containing reaction liquid A, prepared by mixing a sulfating agent (reagent for forming sulfate) at 80° C. to less than 95° C. and a zirconium salt solution at 80° C. to less than 95° C., with a basic zirconium sulfate-containing reaction liquid B, prepared by mixing a sulfating agent at 65° C. to less than 80° C. and a zirconium salt solution at 65° C. to less than 80° C., (2) a second step of aging the reaction liquid obtained in the first step at 95° C. or higher, (3) a third step of forming zirconium hydroxide by adding an alkali to the mixed liquid obtained in the second step to neutralize the basic zirconium sulfate, and (4) a fourth step of heat-treating the zirconium hydroxide to obtain a zirconia porous body.

The examples of Japanese Patent Application Laid-open No. 2006-36576 describe that the maximum value of total pore volume following heat treatment for 3 hours at 1000° C. is 0.7 cc/g. In this manner, although the heat resistance of total pore volume has been improved, further improvement is still required.

DISCLOSURE OF THE INVENTION

An object of the present invention is to provide a porous zirconia powder having improved heat resistance of total pore volume in which the total pore volume following heat treatment for 3 hours at 1000° C. is at least 0.75 ml/g, and the total volume of pores having a diameter of 10 to 100 nm after heat treatment for 3 hours at 1000° C. is at least 30% of the total pore volume. In addition, an object of the present invention is to provide a production method for easily obtaining said powder.

As a result of conducting extensive studies to achieve the above-mentioned objects, the inventors of the present invention found that, in the case of using a specific production method, a porous zirconia powder having improved heat resistance of total pore volume can be easily obtained, thereby leading to completion of the present invention.

Namely, the present invention relates to a porous zirconia powder and production method thereof as described below.

1. A porous zirconia powder wherein total pore volume following heat treatment for three hours at 1000° C. is at least 0.75 ml/g, and total volume of pores having a diameter of 10 to 100 nm following heat treatment for three hours at 1000° C. is at least 30% of the total pore volume.

2. The porous zirconia powder described in 1 above, wherein the specific surface area following heat treatment for three hours at 1000° C. is at least 35 m$^2$/g.

3. The porous zirconia powder described in 1 above, wherein the specific surface area following heat treatment for three hours at 1100° C. is at least 10 m$^2$/g.

4. The porous zirconia powder described in 1 above, containing 1 to 60% of an oxide of one or more types of metals selected from the group consisting of Y, Sc, rare earth metals, transition metal elements, alkaline earth metals, Al, In, Si, Sn, Bi and Zn.

5. A production method of a porous zirconia powder comprising: forming a basic zirconium sulfate by adding a sulfating agent to a zirconium salt solution; forming zirconium hydroxide by neutralizing the basic zirconium sulfate; and heat-treating the zirconium hydroxide; wherein, when adding the sulfating agent to the zirconium salt solution, the sulfating agent is added to the zirconium salt solution having a temperature of 100° C. or higher in an autoclave.

6. The production method described in 5 above, wherein prior to neutralizing the basic zirconium sulfate after having formed the basic zirconium sulfate, a salt of one or more types of metals selected from the group consisting of Y, Sc, rare earth metals, transition metal elements, alkaline earth metals, Al, In, Si, Sn, Bi and Zn is added.

The porous zirconia powder of the present invention has a total pore volume of at least 0.75 ml/g following heat treatment for 3 hours at 1000° C., and the total volume of pores having a diameter of 10 to 100 nm following heat treatment for 3 hours at 1000° C. is at least 30% of the total pore volume, thereby resulting in improved heat resistance of total pore volume. This porous zirconia powder is useful as a co-catalyst or catalyst support of an automotive three-way catalyst used under high-temperature conditions. According to the production method of the present invention, this catalyst can be produced easily.

BEST MODE FOR CARRYING OUT THE INVENTION

The following provides a detailed explanation of the porous zirconia powder and production method thereof of the present invention.

Furthermore, zirconia refers to ordinary zirconia in the present invention, and may contain metal compound impurities such as halfnia at 10% or less.

In the present invention, "%" refers to percent by weight (wt %) unless specifically indicated otherwise.

1. Porous Zirconia Powder

The porous zirconia powder of the present invention has a total pore volume following heat treatment for 3 hours at 100° C. of at least 0.75 ml/g (and preferably at least 0.79 ml/g), and the total volume of pores having a diameter of 10 to 100 nm following heat treatment for 3 hours at 1000° C. is at least 30% (and preferably at least 33%) of total pore volume.

In the case the total pore volume following heat treatment as described above is less than 0.75 ml/g or in the case the total volume of pores having a diameter of 10 to 100 nm following the heat treatment as described above is less than 30% of total pore volume, it becomes difficult to maintain dispersibility of precious metal particles when using as a catalyst support for loading precious metal particles, whereby catalytic activity tends to decrease.

The porous zirconia powder of the present invention preferably has a specific surface area following heat treatment for 3 hours at 1000° C. of at least 35 m$^2$/g, and particularly preferably at least 40 m$^2$/g.

In the case specific surface area following heat treatment as described above is less than 35 m$^2$/g, catalytic activity tends to decrease due to promotion of sintering of precious metal particles based on the decrease in specific surface area.

Furthermore, the porous zirconia powder of the present invention preferably has a specific surface area following heat treatment for 3 hours at 1100° C. of at least 10 m$^2$/g, and particularly preferably at least 20 m$^2$/g.

The porous zirconia powder of the present invention preferably contains 1 to 60%, and more preferably 5 to 55%, of one or more types of oxides of metals selected from the group consisting of Y, Sc, rare earth metals, transition metal elements, alkaline earth metals, Al, In, Si, Sn, Bi and Zn.

Examples of rare earth metals include lanthanoid elements such as La, Ce, Pr and Nd.

Examples of transition metal elements include Ti, Cr, Mn, Fe, Co, Ni, Cu, Mo and W.

Examples of alkaline earth metals include Mg, Ca, Sr and Ba.

Among these metals, Sc, Y and rare earth metals are particularly preferable since they form stable mixed oxides (or composite oxides) with zirconium oxide (zirconia).

In the case the above-mentioned oxide content is less than 1%, it becomes difficult to demonstrate effects resulting from addition thereof. On the other hand, if the oxide content exceeds 60%, heat resistance of total pore volume tends to be inadequate.

Figure 1:
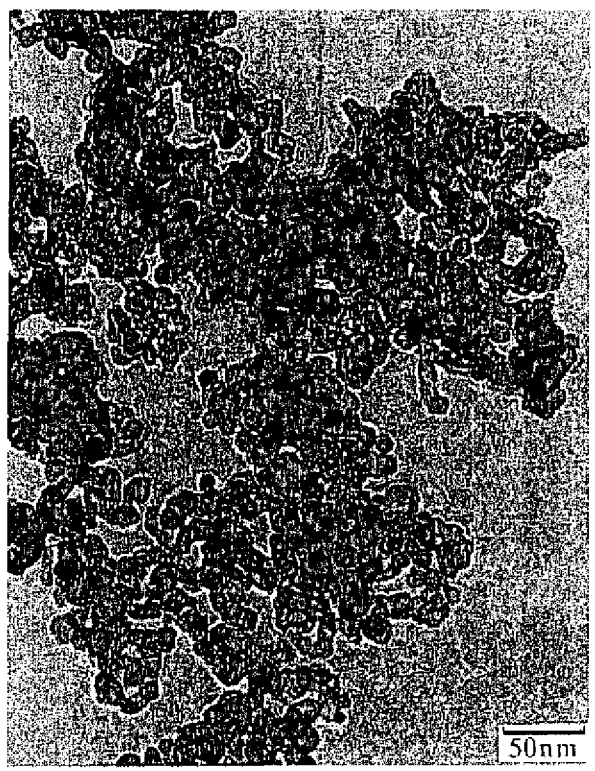
FIG. 1 shows a TEM micrograph of a zirconia powder obtained in Example 1.
Figure 2:
FIG. 2 shows a TEM micrograph of a zirconia powder obtained in Comparative Example 1.

FIGS. 1 and 2 are TEM micrographs of zirconia powders obtained in Example 1 and Comparative Example 1, respectively. As is clear from FIG. 1, the zirconia powder of the present invention can be seen to consist of extremely weakly aggregated particles. On the other hand, the aggregation shown in FIG. 2 (Comparative Example 1) is strong.

In this manner, it is believed that as a result of aggregation being extremely weak, sintering among particles does not occur at high temperatures (1000° C. or higher), and initial total pore volume, distribution thereof and specific surface area can be maintained.

2. Porous Zirconia Powder Production Method

The production method of the present invention is a method for producing a porous zirconia powder by adding a sulfating agent (a reagent for forming a sulfate that forms basic zirconium sulfate by reacting with zirconium ion in the present invention) to a zirconium salt solution to form basic zirconium sulfate, neutralizing the basic zirconium sulfate to form zirconium hydroxide, and then heat-treating the zirconium hydroxide, wherein during addition of the sulfating agent to the zirconium salt solution, the sulfating agent is added to the zirconium salt solution having a temperature of 100° C. or higher in an autoclave.

The zirconium salt is only required to be that which supplies zirconium ion, and examples of zirconium salts that can be used include zirconium oxynitrate, zirconium oxychloride and zirconium nitrate. One or two or more types of these zirconium salts can be used. Among these, zirconium oxychloride is preferable due to its high productivity on an industrial scale.

A solvent for producing a zirconium salt solution may be selected according to the type of zirconium salt, and normally water (pure water or ion exchange water, to apply similarly hereinafter) is preferable.

Although there are no particular limitations on the concentration of the zirconium salt solution, typically 5 to 250 g (and particularly 20 to 150 g) as zirconium oxide ($ZrO_2$) are preferably contained in 1000 g of solvent.

There are no particular limitations on the sulfating agent provided it forms a sulfate by reacting with zirconium ion (namely, a sulfating reagent), and examples include sodium sulfate, potassium sulfate and ammonium sulfate. Although the sulfating agent may be in any form such as a powder or solution, a solution (and particularly an aqueous solution) is preferable. The concentration of the solution in the case of using a solution can be suitably set.

The sulfating agent is preferably added so that the weight ratio of sulfate radical ($SO_4^{2-}$) to $ZrO_2$ is 0.3 to 0.6. In addition, the free acid concentration of a mixed solution is preferably 0.2 to 2.2N (normal). Examples of free acid include sulfuric acid, nitric acid and hydrochloric acid. Although there are no limitations on the type of free acid, hydrochloric acid is preferable due to its high productivity on an industrial scale.

The zirconium salt solution and sulfating agent are normally reacted at a temperature of 65° C. or higher to form basic zirconium sulfate. In the present invention, basic zirconium sulfate is formed by adding the sulfating agent to the zirconium salt solution having a temperature of 100° C. or higher (and preferably 110 to 150° C.) in an autoclave.

In the case the temperature of the zirconium salt solution is below 100° C., the sulfating reaction is slow and large aggregated particles are formed easily, thereby making this undesirable. Consequently, in the present invention, it is essential that the temperature be 100° C. or higher.

Although there are no particular limitations thereon, the pressure conditions during sulfation are preferably $1.02 \times 10^5$ to $4.91 \times 10^5$ Pa, and more preferably $1.45 \times 10^5$ to $4.91 \times 10^5$ Pa.

The reaction liquid is preferably retained in an autoclave for 10 to 60 minutes following sulfation to age the formed basic zirconium sulfate. There are no limitations on the basic zirconium sulfate, and examples include hydrates of compounds such as $ZrOSO_4$, $ZrO_2$, $5ZrO_2 \cdot 3SO_3$ and $7ZrO_2 \cdot 3SO_3$. Furthermore, the basic zirconium sulfate may be one type or a mixture of two or more types of the above-mentioned compounds.

In the present invention, the formation of basic zirconium sulfate is rapidly accelerated by the addition of a sulfating agent under high temperature conditions. As a result, aggregated particles having extremely weak aggregation are formed without promoting nucleus growth of the basic zirconium sulfate. The zirconia powder (particles) obtained by neutralizing and calcining these aggregated particles does not exhibit sintering of particles even at high temperatures of 1000° C. or higher, and is believed to easily maintain initial total pore volume, the distribution thereof and specific surface area.

Following sulfation, a slurry containing basic zirconium sulfate is removed from the autoclave and cooled to 80° C. or lower and preferably 60° C. or lower.

In the case a metal oxide as described above is contained in the porous zirconia powder of the present invention, a predetermined amount of a salt of one type or two or more types of metal selected from the group consisting of Y, Sc, rare earth metals, transition metal elements, alkaline earth metals, Al, In, Si, Sn, Bi and Zn is preferably added prior to the neutralization step following sulfation.

Next, zirconium hydroxide is obtained by neutralizing the basic zirconium sulfate with an alkali. There are no limitations on the alkali, and examples include ammonium hydroxide, ammonium bicarbonate, sodium hydroxide and potassium hydroxide. Among these, sodium hydroxide is preferable from the aspect of industrial costs.

There are no particular limitations on the amount of alkali added insofar as it allows zirconium hydroxide to be formed as a precipitate from a basic zirconium sulfate solution. Normally, base is added so that the pH of the above-mentioned solution is 11 or higher and preferably 12 or higher.

Following the neutralization reaction, the zirconium hydroxide-containing solution is preferably held at 35 to 60° C. for 1 hour or more. As a result, the formed precipitate is aged while also facilitating filtration.

Next, the zirconium hydroxide is recovered by a solid-liquid separation method. Examples of methods that can be used include filtration, centrifugal separation and decantation.

Following recovery of the zirconium hydroxide, the zirconium hydroxide is preferably washed with water to remove adhered impurities.

The zirconium hydroxide may be dried by air drying or heat drying. Crushing treatment or classifying treatment and the like may be carried out following drying treatment as necessary.

Finally, a porous zirconia powder is obtained by subjecting the zirconium hydroxide to heat treatment. There are no limitations on the temperature during heat treatment, and heat treatment for about 1 to 5 hours at about 400 to 900° C. is preferable. The heat treatment atmosphere is preferably air or an oxidizing atmosphere.

The resulting porous zirconia powder may be pulverized. Examples of pulverizing machines that can be used include a planetary mill, ball mill or jet mill.

EXAMPLES

The following provides a detailed explanation of the present invention by indicating examples and comparative examples thereof. However, the present invention is not limited to the examples.

The methods used to measure specific surface area and total pore volume are described below.
(1) Specific Surface Area Specific surface area was measured by the BET method using a specific surface area analyzer (Flowsorb II, Micromeritics Inc.).
(2) Total Pore Volume Total pore volume was measured according to the mercury intrusion method using an automated pore size distribution analyzer (Pore Master 60-GT). The measuring range was 0.0036 to 10.3 μm.

The term "Fresh" in Table 1 refers to oxide obtained by heat treating zirconium hydroxide for 5 hours at 600° C. In addition, the phrase "1000° C., after 3 hours" refers to additional heat treatment of the oxide for 3 hours at 1000° C. Specific surface area and total pore volume in these cases were measured after allowing to cool to room temperature following heat treatment.

Example 1

187 g of zirconium oxychloride octohydrate (72 g as $ZrO_2$) were dissolved in ion exchange water followed by adjusting to an acid concentration of 0.67 N and $ZrO_2$ concentration of 4 w/v % with 35% hydrochloric acid and ion exchange water.

The resulting solution was placed in an autoclave, the pressure was set to $2 \times 10^5$ Pa and the temperature was raised to 120° C. followed by adding 1065 g of 5% sodium sulfate (sulfating agent) at the same temperature and holding at that temperature for an additional 15 minutes. Following sulfation, the solution was allowed to cool on standing to room temperature to obtain a slurry containing basic zirconium sulfate.

210 g of cerium nitrate solution (21 gas $CeO_2$), 20 g of lanthanum nitrate solution (2 gas $La_2O_3$) and 50 g of neodymium nitrate solution (5 g as $Nd_2O_3$) were added to the basic zirconium sulfate-containing slurry. Next, 500 g of 25% sodium hydroxide (neutralizing alkali) were added over the course of 60 minutes. Zirconium hydroxide was formed as a result of this neutralization.

Next, after filtering the zirconium hydroxide-containing slurry and washing with water, the zirconium hydroxide was calcined for 5 hours at 600° C. to obtain oxide. This oxide was then crushed with a mortar to 20 μm or less.

Figure 3:
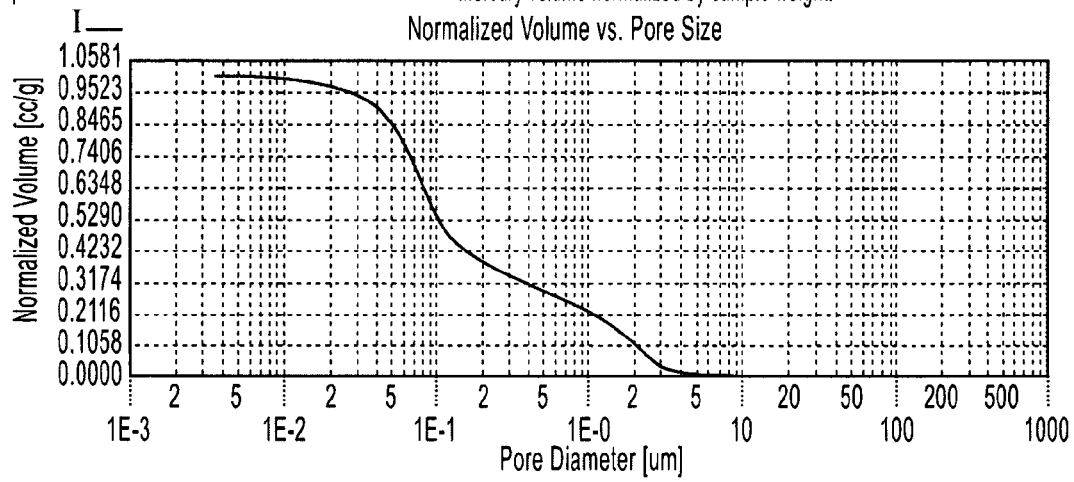
FIG. 3 shows the results of measuring total pore volume of a zirconia powder obtained in Example 1.

The composition of the resulting crushed powder (as oxide), specific surface area (SA) and specific surface area after three types of surface treatment (Aged SA *1 to *3) are shown in Table 1. In addition, the total pore volume of the crushed powder (Fresh) and the total pore volume after two types of heat treatment are also shown in the table. Moreover, the results of measuring total pore volume (graph) are shown in FIG. 3.

Example 2

117 g of zirconium oxychloride octohydrate (45 g as $ZrO_2$) were dissolved in ion exchange water followed by adjusting to an acid concentration of 0.67 N and $ZrO_2$ concentration of 4 w/v % with 35% hydrochloric acid and ion exchange water. The resulting solution was placed in an autoclave, the pressure was set to $2 \times 10^5$ Pa and the temperature was raised to 120° C. followed by adding 665 g of 5% sodium sulfate (sulfating agent) at the same temperature and holding at that temperature for an additional 15 minutes. Following sulfation, the solution was allowed to cool on standing to room temperature to obtain a slurry containing basic zirconium sulfate.

450 g of cerium nitrate solution (45 gas $CeO_2$), 30 g of lanthanum nitrate solution (3 g as $La_2O_3$) and 70 g of praseodymium nitrate solution (7 g as $Pr_6O_{11}$) were added to the basic zirconium sulfate-containing slurry. Next, 500 g of 25% sodium hydroxide (neutralizing alkali) were added over the course of 60 minutes. Zirconium hydroxide was formed as a result of this neutralization.

Next, after filtering the zirconium hydroxide-containing slurry and washing with water, the zirconium hydroxide was calcined for 5 hours at 600° C. to obtain oxide. This oxide was then crushed with a mortar to 20 μm or less.

The composition of the resulting crushed powder (as oxide), specific surface area (SA) and specific surface area after three types of surface treatment (Aged SA *1 to *3) are shown in Table 1. In addition, the total pore volume of the crushed powder (Fresh) and the total pore volume after two types of heat treatment are also shown in the table.

Comparative Example 1

187 g of zirconium oxychloride octohydrate (72 g as $ZrO_2$) were dissolved in ion exchange water followed by adjusting to an acid concentration of 0.67 N and $ZrO_2$ concentration of 4 w/v % with 35% hydrochloric acid and ion exchange water. The resulting solution was heated to 60° C. followed by adding 1065 g of 5% sodium sulfate (sulfating agent) at the same temperature. Next, the temperature was raised to 95° C. and after holding at that same temperature for 15 minutes, the solution was allowed to cool on standing to room temperature to obtain a slurry containing basic zirconium sulfate.

210 g of cerium nitrate solution (21 gas $CeO_2$), 20 g of lanthanum nitrate solution (2 gas $La_2O_3$) and 50 g of neodymium nitrate solution (5 g as $Nd_2O_3$) were added to the basic zirconium sulfate-containing slurry. Next, 500 g of 25% sodium hydroxide (neutralizing alkali) were added over the course of 60 minutes. Zirconium hydroxide was formed as a result of this neutralization.

Next, after filtering the zirconium hydroxide-containing slurry and washing with water, the zirconium hydroxide was calcined for 5 hours at 600° C. to obtain oxide. This oxide was then crushed with a mortar to 20 μm or less.

Figure 4:
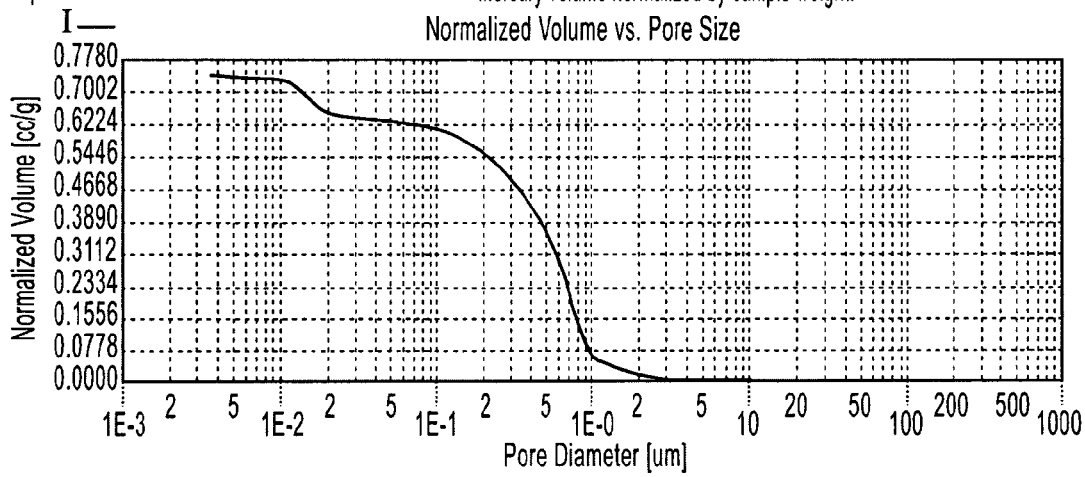
FIG. 4 shows the results of measuring total pore volume of a zirconia powder obtained in Comparative Example 1.

The composition of the resulting crushed powder (as oxide), specific surface area (SA) and specific surface area after three types of surface treatment (Aged SA *1 to *3) are shown in Table 1. In addition, the total pore volume of the crushed powder (Fresh) and the total pore volume after two types of heat treatment are also shown in the table. Moreover, the results of measuring total pore volume (graph) are shown in FIG. 4.

TABLE 1

|  | Example 1 | Example 2 | Comp. Ex. 1 |
|---|---|---|---|
| $ZrO_2$, wt % | 72 | 45 | 72 |
| $CeO_2$, wt % | 21 | 45 | 21 |
| $La_2O_3$, wt % | 2 | 3 | 2 |
| $Nd_2O_3$, wt % | 5 | — | 5 |
| $Pr_6O_{11}$, wt % | — | 7 | — |
| Specific surface area SA, $m^2/g$ | 65 | 77 | 62 |
| Aged SA *1, $m^2/g$ | 48 | 45 | 38 |
| Aged SA *2, $m^2/g$ | 25 | 25 | 8 |
| Aged SA *3, $m^2/g$ | 9 | 12 | 4 |
| Total pore volume, ml/g (Fresh) | 1.05 | 0.86 | 0.91 |
| Total pore volume, ml/g (after heat treatment for 3 hours at 1000°) | 0.82 | 0.79 | 0.74 |
| 10-100 nm volume ratio, % (after heat treatment for 3 hours at 1000°) | 57 | 33 | 16 |

*1: After heat treatment for 3 hours at 1000° C.
*2: After heat treatment for 3 hours at 1100° C.
*3: After heat treatment for 6 hours at 1150° C.

As is clear from Table 1, the porous zirconia powders of the present invention demonstrated a total pore volume after heat treatment for 3 hours at 1000° C. of 0.75 ml/g or more, and the total volume of pores having a diameter of 10 too 100 nm after heat treatment for 3 hours at 1000° C. was 30% or more of total pore volume. In other words, in comparison with Comparative Example 1, the porous zirconia powders of Examples 1 and 2 demonstrated improved heat resistance of total pore volume. In addition, from the viewpoint of heat resistance of specific surface area as well, the specific surface area after heat treatment for 3 hours at 1100° C. was 25 $m^2/g$, which can be seen to be a considerable improvement in heat resistance as compared with Comparative Example 1.

The invention claimed is:

1. A porous zirconia powder, wherein total pore volume following heat treatment for three hours at 1000° C. is at least 0.75 ml/g, and total volume of pores having a diameter of 10 to 100 nm following heat treatment for three hours at 1000° C. is at least 30% of the total pore volume.

2. The porous zirconia powder according to claim 1, wherein the specific surface area following heat treatment for three hours at 1000° C. is at least 35 $m^2/g$.

3. The porous zirconia powder according to claim 1, wherein the specific surface area following heat treatment for three hours at 1100° C. is at least 10 $m^2/g$.

4. The porous zirconia powder according to claim 1, containing 1 to 60 wt % of an oxide of one or more types of metals selected from the group consisting of Y, Sc, rare earth metals, transition metal elements, alkaline earth metals, Al, In, Si, Sn, Bi and Zn.

5. The porous zirconia powder according to claim 1, containing 1 to 60 wt % of an oxide of one or more types of metals selected from the group consisting of Y, Sc and rare earth metals.

* * * * *